(12) United States Patent
Kinomoto et al.

(10) Patent No.: US 10,578,003 B2
(45) Date of Patent: Mar. 3, 2020

(54) BOTTOM COVER AND COOLING DUCT

(71) Applicant: TOYOTA JIDOSHA KABUSHIKI KAISHA, Toyota-shi, Aichi-ken (JP)

(72) Inventors: Hiroshi Kinomoto, Toyota (JP); Yasuhiko Koda, Toyota (JP); Hiromichi Sato, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/059,981

(22) Filed: Aug. 9, 2018

(65) Prior Publication Data

US 2019/0072023 A1    Mar. 7, 2019

(30) Foreign Application Priority Data

Sep. 1, 2017    (JP) .................. 2017-167716

(51) Int. Cl.
| | |
|---|---|
| *B60K 11/00* | (2006.01) |
| *F01P 1/06* | (2006.01) |
| *F01P 11/10* | (2006.01) |
| *B60K 11/06* | (2006.01) |
| *B60K 11/08* | (2006.01) |
| *F01P 11/02* | (2006.01) |

(Continued)

(52) U.S. Cl.
CPC ............... *F01P 1/06* (2013.01); *B60K 11/06* (2013.01); *B60K 11/08* (2013.01); *F01P 11/0285* (2013.01); *F01P 11/10* (2013.01); *B60K 13/04* (2013.01); *B62D 25/20* (2013.01)

(58) Field of Classification Search
CPC ........ F01P 1/06; F01P 1/00; F01P 1/08; F01P 11/0285; F01P 11/10; F01P 2001/005; B60K 11/06; B60K 11/08; B60K 11/00; B60K 13/04; B60K 13/06; B62D 25/20
See application file for complete search history.

(56) References Cited

U.S. PATENT DOCUMENTS 3,724,357 A * 4/1973 Kavthekar ........... B60H 1/0055
                                                                   454/152
5,813,491 A * 9/1998 Sato ...................... B60K 13/04
                                                                   180/309

(Continued)

FOREIGN PATENT DOCUMENTS

| JP | H09-076948 A | 3/1997 |
|---|---|---|
| JP | 2000-087746 A | 3/2000 |
| JP | 2003-276648 A | 10/2003 |

*Primary Examiner* — James M Dolak
(74) *Attorney, Agent, or Firm* — Oliff PLC

(57) ABSTRACT

A bottom cover includes a plate portion including an inner-peripheral-edge portion defining an inlet, and a cooling duct including an upper wall and a pair of right and left sidewalls. The upper wall includes an upper-wall front portion inclined upward in the vehicle-height direction at a predetermined inclination angle, an upper-wall rear portion inclined upward in the vehicle-height direction at an inclination angle larger than the predetermined inclination angle of the upper-wall front portion, and the first upper-wall bent portion located at a boundary between the upper-wall front portion and the upper-wall rear portion. The rear ends of the right and left sidewalls, the rear end of the inner-peripheral-edge portion, and the rear end of the upper wall define an outlet.

7 Claims, 7 Drawing Sheets

(51) Int. Cl.
*B60K 13/04* (2006.01)
*B62D 25/20* (2006.01)

(56) References Cited

U.S. PATENT DOCUMENTS

| | | | | |
|---|---|---|---|---|
| 7,364,002 | B2* | 4/2008 | Mabuchi | B62D 21/02 |
| | | | | 180/291 |
| 7,997,376 | B2* | 8/2011 | Fujita | B60K 13/04 |
| | | | | 180/296 |
| 8,668,245 | B2* | 3/2014 | Kakiuchi | B62D 35/02 |
| | | | | 296/180.1 |
| 9,193,393 | B2* | 11/2015 | Moss | B62D 25/20 |
| 9,688,314 | B2* | 6/2017 | Ajisaka | B62D 25/20 |
| 9,821,731 | B2* | 11/2017 | Dubois | B60K 13/06 |
| 9,944,173 | B2* | 4/2018 | Ajisaka | B60K 13/04 |
| 9,981,701 | B2* | 5/2018 | Yonezawa | B62D 25/20 |
| 10,081,398 | B2* | 9/2018 | McMillan | B62D 35/005 |
| 10,377,228 | B2* | 8/2019 | Kondo | B60K 13/04 |
| 10,435,080 | B2* | 10/2019 | Hijikata | B62D 25/20 |

* cited by examiner

BOTTOM COVER AND COOLING DUCT

INCORPORATION BY REFERENCE

The disclosure of Japanese Patent Application No. 2017-168716 filed on Sep. 1, 2017 including the specification, drawings and abstract is incorporated herein by reference in its entirety.

BACKGROUND

1. Technical Field

The disclosure relates to a bottom cover and a cooling duct.

2. Description of Related Art

Japanese Unexamined Patent Application Publication No. 09-76948 (JP 09-76948 A) describes an engine bottom cover provided with a cooling duct. The air flowing under the engine bottom cover is introduced into a floor tunnel and then brought into contact with a fuel tank. The air guided by the cooling duct is brought into contact with the fuel tank, thereby cooling the fuel tank.

SUMMARY

In JP 09-76948 A, the fuel tank, which is an object to be cooled (hereinafter, referred to as "cooling object"), is disposed rearward of the floor tunnel in the vehicle front-rear direction, and thus the air guided by the cooling duct of the engine bottom cover can be brought into contact with the fuel tank through the floor tunnel. However, when a cooling object is disposed above the cooling duct in the vehicle-height direction, it may not be possible to bring the air into contact with the cooling object. In this regard, the foregoing related art still has room for improvement.

The disclosure provides a bottom cover and a cooling duct configured to cool a cooling object even when the cooling object is disposed above the cooling duct in the vehicle-height direction.

A first aspect of the disclosure provides a bottom cover. The bottom cover includes a plate portion and a cooling duct. The plate portion covers a lower surface of a vehicle, and includes an inner-peripheral-edge portion. The inner-peripheral-edge portion defines an inlet that is opened in a vehicle-height direction. The inner-peripheral-edge portion includes a pair of right and left ends of the inner-peripheral-edge portion in a vehicle-width direction, a front end of the inner-peripheral-edge portion, and a rear end of the inner-peripheral-edge portion. The cooling duct includes an upper wall, and a pair of right and left sidewalls. The upper wall is inclined upward in the vehicle-height direction as the upper wall extends toward a rear of the vehicle in a vehicle front-rear direction. The upper wall includes a pair of right and left ends of the upper wall in the vehicle-width direction, a rear end of the upper wall, and a front end of the upper wall. The front end of the upper wall is connected to the front end of the inner-peripheral-edge portion. The upper wall includes an upper-wall front portion, an upper-wall rear portion, and a first upper-wall bent portion. The upper-wall front portion is inclined upward in the vehicle-height direction at a predetermined inclination angle. The upper-wall rear portion is inclined upward in the vehicle-height direction at an inclination angle larger than the predetermined inclination angle of the upper-wall front portion. The first upper-wall bent portion is located at a boundary between the upper-wall front portion and the upper-wall rear portion. The right sidewall includes a rear end of the right sidewall, and the left sidewall includes a rear end of the left sidewall. The right sidewall connects the right end of the inner-peripheral-edge portion to the right end of the upper wall, and the left sidewall connects a left end of an inner-peripheral-edge portion to a left end of the upper wall. The rear ends of the right and left sidewalls, the rear end of the inner-peripheral-edge portion, and the rear end of the upper wall define an outlet. The dimension of the inlet in the vehicle-width direction may increase toward the rear of the vehicle, in a vehicle bottom view. The upper wall may have substantially the same shape as the shape of the inlet, in a vehicle bottom view.

According to the first aspect, the upper wall includes the first upper-wall bent portion located at the boundary between the upper-wall front portion and the upper-wall rear portion. Thus, the upper-wall rear portion is inclined upward in the vehicle-height direction at the inclination angle that is larger than the predetermined inclination angle at which the upper-wall front portion is inclined upward in the vehicle-height direction. Thus, the air that enters the inlet, is drawn to the upper wall, flows along the upper wall, and then flows out of the outlet is caused to flow further upward in the vehicle-height direction.

In the bottom cover according to the first aspect, an angle made by the upper-wall rear portion and a horizontal virtual plane may be set to be substantially two times larger than an angle made by the upper-wall front portion and the horizontal virtual plane.

In the foregoing configuration, the angle made by the upper-wall rear portion and the horizontal virtual plane is set to be substantially two times larger than the angle made by the upper-wall front portion and the horizontal virtual plane. Thus, the air flowing along the upper-wall front portion flows along the upper-wall rear portion without being separated from the upper wall. Thus, the air flowing along the upper wall and then flowing out of the outlet is more reliably caused to flow upward in the vehicle-height direction. As a result, it is possible to further reliably cool a cooling object.

In the bottom cover according to the first aspect, each of the right and left sidewalls may include a sidewall front portion, a sidewall rear portion, and a sidewall bent portion. The sidewall front portion may be inclined at a predetermined inclination angle, in a vehicle bottom view. At least a part of the sidewall rear portion, the part being adjacent to the sidewall front portion, may be inclined at an inclination angle that is larger than the predetermined inclination angle of the sidewall front portion, in the vehicle bottom view. The sidewall bent portion may be located at a boundary between the sidewall front portion and the sidewall rear portion. The sidewall bent portion may be located at substantially the same position as a position of the first upper-wall bent portion in the vehicle front-rear direction.

In the foregoing configuration, each of the right and left sidewalls includes the sidewall bent portion located at the boundary between the sidewall rear portion and the sidewall front portion. With this configuration, in each of the sidewalls, at least the part of the sidewall rear portion, which is adjacent to the sidewall front portion, is inclined outward in the vehicle-width direction at the inclination angle that is larger than the predetermined inclination angle at which the sidewall front portion is inclined outward in the vehicle-width direction, in a vehicle bottom view. The air flowing substantially in the vehicle front-rear direction along the bottom cover is easily separated from the bottom cover, especially near the sidewall bent portion of each sidewall. Due to the separation of the air from the bottom cover, a negative pressure is generated, and thus a larger amount of air is drawn to the upper wall. The first upper-wall bent portion and the sidewall bent portions are located at substantially the same position in the vehicle front-rear direction. Thus, the air that is separated from the bottom cover and then drawn to the upper wall is caused to flow further upward in the vehicle-height direction by the first upper-wall bent portion of the upper wall. As a result, even when a cooling object is disposed above the cooling duct in the vehicle-height direction, it is possible to further reliably cool the cooling object.

In the bottom cover according to the first aspect, the outlet may be opened substantially rearward in the vehicle front-rear direction.

In the foregoing configuration, the outlet is opened substantially rearward in the vehicle front-rear direction. Thus, the air flowing from the front side of the vehicle while the vehicle is traveling is caused to flow smoothly from the inlet to the outlet. As a result, it is possible to cool a cooling object while restraining the air drag.

In the bottom cover according to the first aspect, the upper wall may further include an upper-wall rearmost portion, and a second upper-wall bent portion. The upper-wall rearmost portion may be inclined upward in the vehicle-height direction at an inclination angle that is larger than the inclination angle of the upper-wall rear portion. The first upper-wall bent portion may be located at the boundary between the upper-wall front portion and the upper-wall rear portion. The second upper-wall bent portion may be located at a boundary between the upper-wall rear portion and the upper-wall rearmost portion.

In the foregoing configuration, due to provision of the second upper-wall bent portion, there is provided the upper-wall rearmost portion that is inclined upward in the vehicle-height direction at the inclination angle that is larger than the inclination angle of the upper-wall rear portion. Thus, the air is caused to flow further upward in the vehicle-height direction along the upper wall. As a result, even when a cooling object is disposed above the cooling duct in the vehicle-height direction, it is possible to bring the air into contact with the cooling object, thereby cooling the cooling object.

A second aspect of the disclosure provides a cooling duct. The cooling duct includes: an introduction port that is provided in a bottom cover that covers a vehicle lower surface, and is opened in a vehicle height direction; an upper wall of which a front end is in contact with a front end of the introduction port, and which is inclined upward in the vehicle-height direction as it extends toward a rear of the vehicle in a vehicle front-rear direction; a pair of right and left side walls which respectively connect ends of the introduction port in a vehicle width direction and ends of the upper wall in the vehicle width direction to each other; a discharge port that is formed by rear ends of the introduction port, the side walls, and the upper wall; and an upper wall bent portion that is provided in the upper wall, and is located at a boundary between an upper wall front portion that is inclined at a predetermined inclination angle, and an upper wall rear portion that is inclined at an inclination angle greater than the inclination angle of the upper wall front portion. The introduction port may be formed in a shape in which dimensions in the vehicle width direction increase as it extends toward the rear of the vehicle, in a vehicle bottom view. The upper wall may be formed in substantially the same shape as that of the introduction port in a vehicle bottom view.

According to the aspect, the introduction port is provided in the bottom cover that covers the vehicle lower surface. The introduction port is formed in a shape which is opened in the vehicle-height direction and in which dimensions in the vehicle width direction increase as it extends toward the rear of the vehicle in a vehicle bottom view. In addition, according to the aspect of the disclosure, the upper wall, which is formed in substantially the same shape as that of the introduction port in a vehicle bottom view, is provided. The front end of the upper wall is in contact with the front end of the introduction port, and the upper wall is inclined to the vehicle upper side as it extends toward the rear of the vehicle. In addition, the ends of the introduction port in the vehicle width direction and the ends of the upper wall in the vehicle width direction are respectively connected to each other by the pair of right and left side walls. According to this, air passing through the vehicle lower side of the bottom cover is introduced from the introduction port, and flows out from the discharge port formed by the rear ends of the introduction port, the side walls, and the upper wall along the side walls and the upper wall.

According to the aspect, the upper wall is provided with the upper wall bent portion that is located at a boundary between the upper wall front portion and the upper wall rear portion, and thus the upper wall rear portion is further inclined upward in the vehicle-height direction in comparison to the upper wall front portion that is inclined at a predetermined inclination angle. Accordingly, it is possible to allow air, which is introduced from the introduction port, is drawn to the upper wall, and flows out from the discharge port along the upper wall, to flow out toward a further vehicle upper side.

According to the first and second aspects of the disclosure, it is possible to cool a cooling object even when the cooling object is disposed above the cooling duct in the vehicle-height direction.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
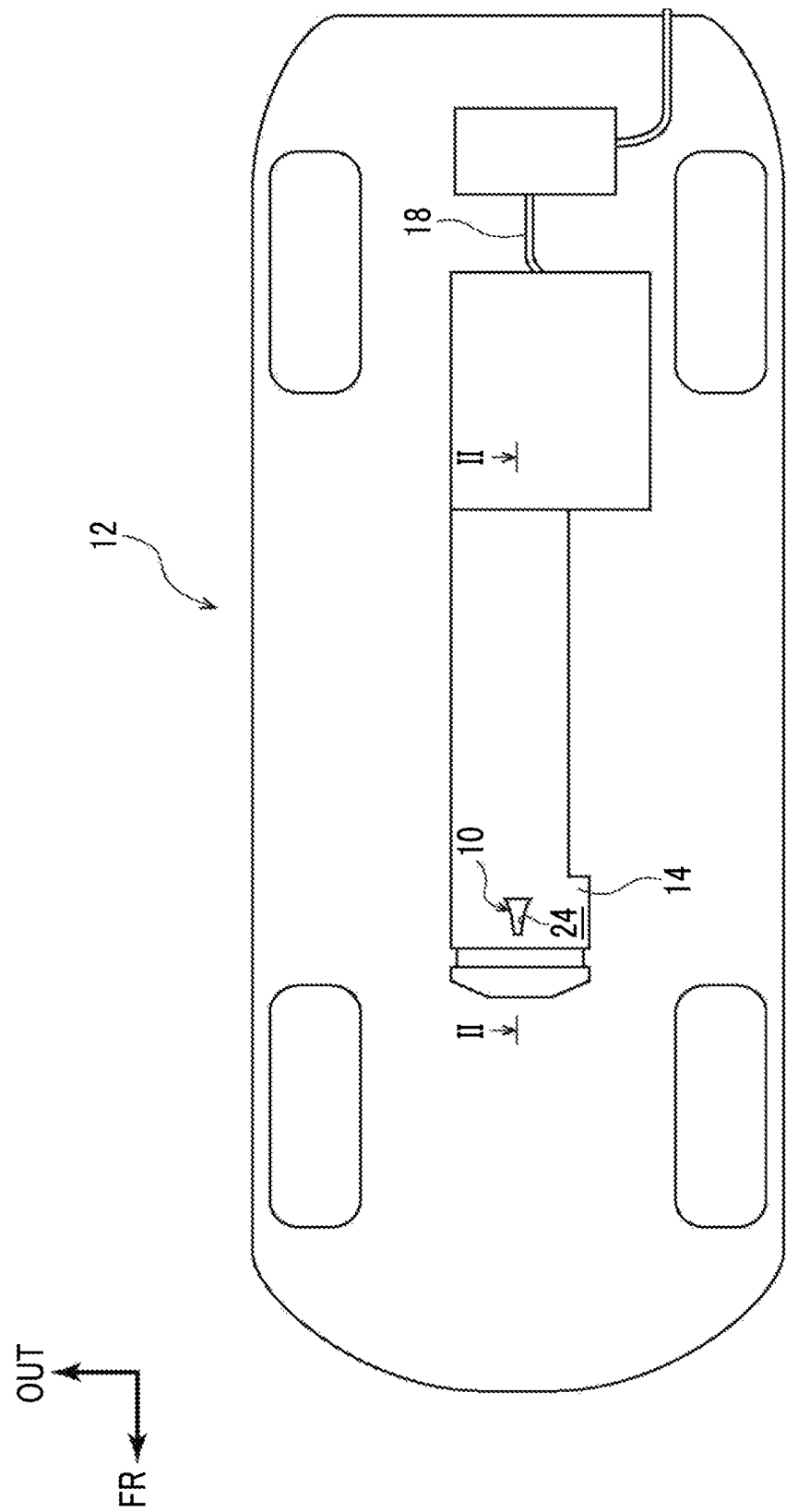
FIG. 1 is a vehicle bottom view illustrating a bottom cover provided with a cooling duct according to a first embodiment.

Hereinafter, example embodiments of the disclosure will be described in detail with reference to the accompanying drawings. Note that, the direction indicated by an arrow FR in the drawings will denote the forward direction along the vehicle front-rear direction, the direction indicated by an arrow OUT in the drawings will denote the outward direction along the vehicle-width direction, and the direction indicated by an arrow UP will denote the upward direction along the vehicle-height direction.

First Embodiment

The configuration of a cooling duct 10 according to a first embodiment will be described with reference to FIG. 1. A lower surface of a vehicle 12 is provided with a bottom cover 14. The bottom cover 14 is disposed so as to cover an exhaust pipe 18 (refer to FIG. 2) from below in the vehicle-height direction. The exhaust pipe 18 is disposed in a center tunnel 16 of the vehicle 12. The bottom cover 14 has a generally flat-plate shape. As illustrated in FIG. 3, the bottom cover 14 includes a plate portion 11 and the cooling duct 10.

Figure 2:
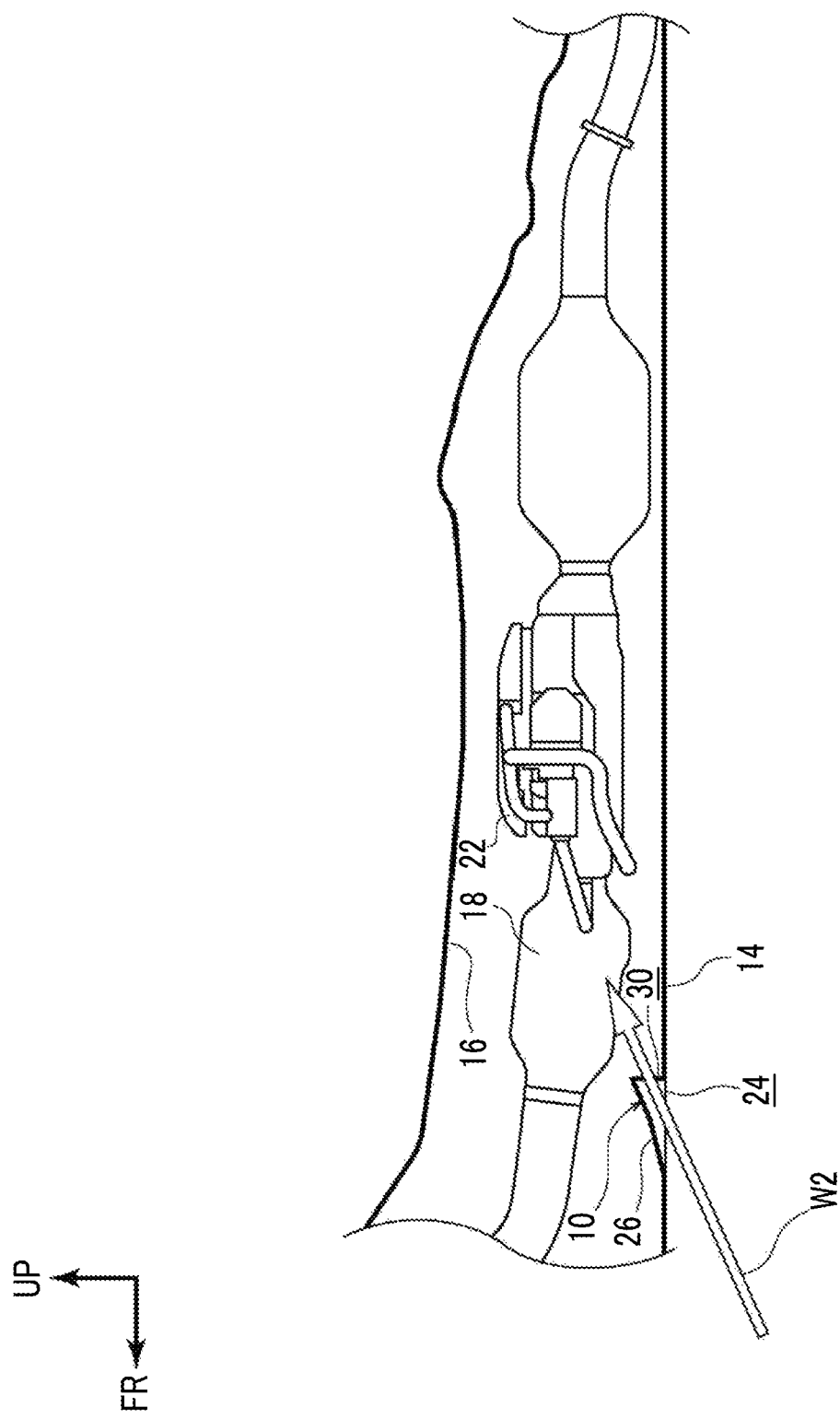
FIG. 2 is an enlarged sectional view taken along line II-II in FIG. 1.
Figure 3:
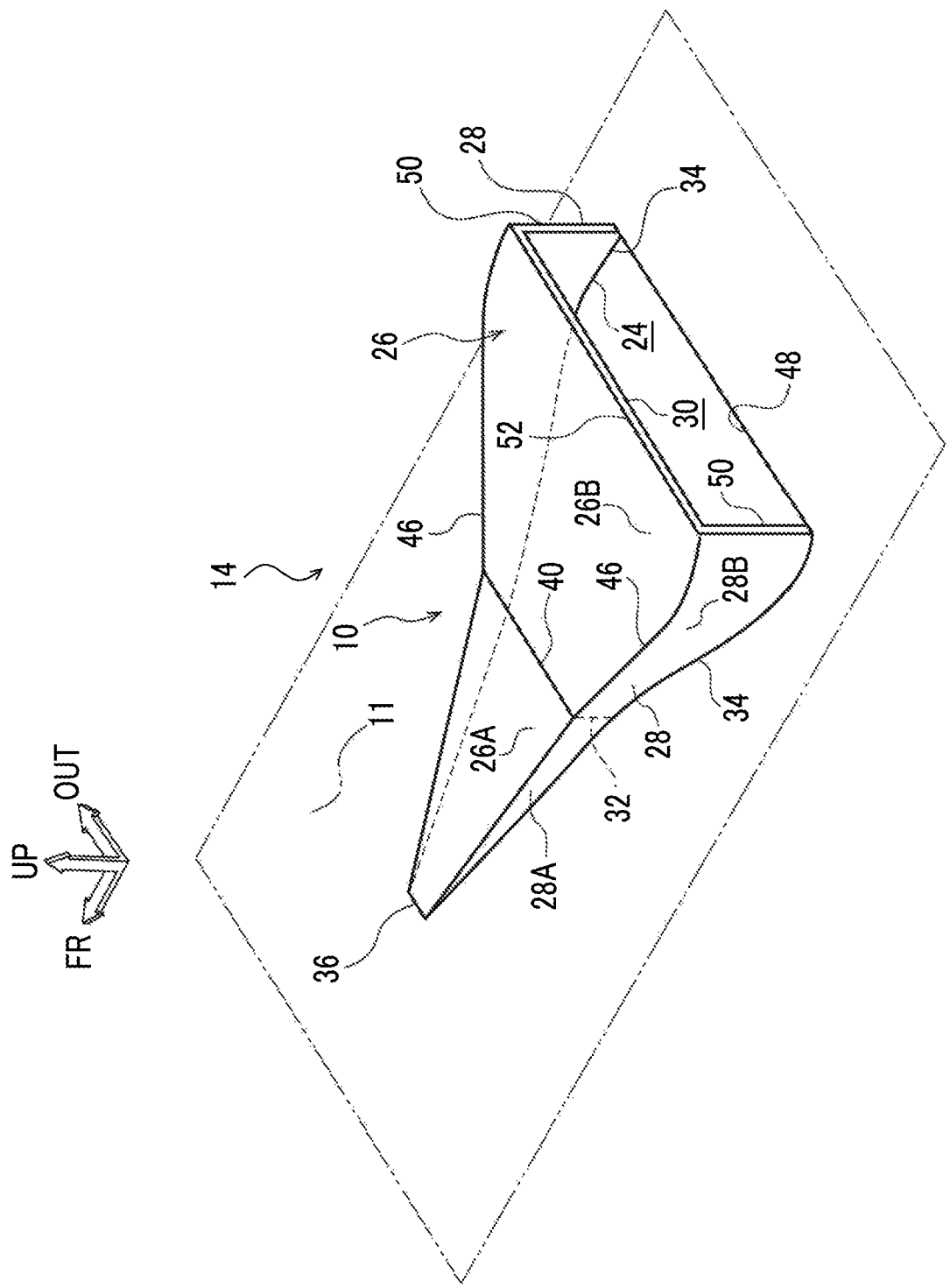
FIG. 3 is a perspective view illustrating a state where the bottom cover provided with the cooling duct according to the first embodiment is viewed from a position inside a vehicle in a direction toward the outside of the vehicle.

As illustrated in FIG. 2, the bottom cover 14 is provided with the cooling duct 10. The cooling duct 10 may be formed integrally with the bottom cover 14. Alternatively, the cooling duct 10 formed separately from the bottom cover under 14 may be attached to the bottom cover under 14. The cooling duct 10 is disposed at a position corresponding to the center tunnel 16 of the vehicle 12 and forward of an exhaust heat recovery device 22 in the vehicle front-rear direction. The exhaust pipe 18 is provided with the exhaust heat recovery device 22. The exhaust heat recovery device 22 is an example of an object to be cooled (hereinafter, referred to as "cooling object").

Figure 4:
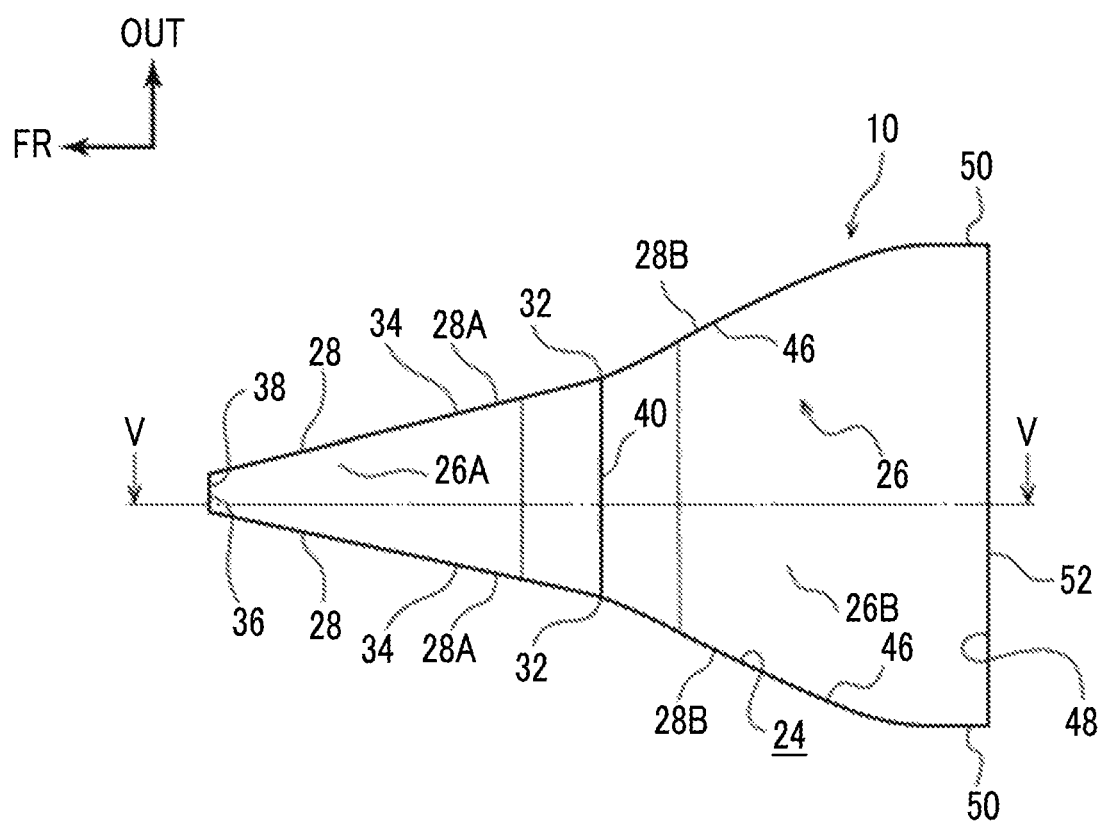
FIG. 4 is a vehicle bottom view illustrating a part of the bottom cover provided with the cooling duct according to the first embodiment.

As illustrated in FIG. 3, the bottom cover 14 includes an inlet 24 (refer to FIG. 2), an upper wall 26, a pair of right and left sidewalls 28, and an outlet 30 (refer to FIG. 2). The plate portion 11 includes an inner-peripheral-edge portion defining an inlet 24. The inner-peripheral-edge portion includes a pair of right and left ends 34 of the inner-peripheral-edge portion in a vehicle-width direction, a front end 38 of the inner-peripheral-edge portion, and a rear end 48 of the inner-peripheral-edge portion. The inlet 24 is opened in the vehicle-height direction. As illustrated in FIG. 4, in a vehicle bottom view, the inlet 24 has a generally trapezoidal shape and the dimension of the inlet 24 in the vehicle-width direction increases toward the rear of the vehicle 12. The inner-peripheral-edge portion has a pair of right and left ends 34 in the vehicle-width direction. The right and left ends 34 are bent at positions corresponding to sidewall bent portions 32 (described later) provided in the sidewalls 28.

Figure 5:
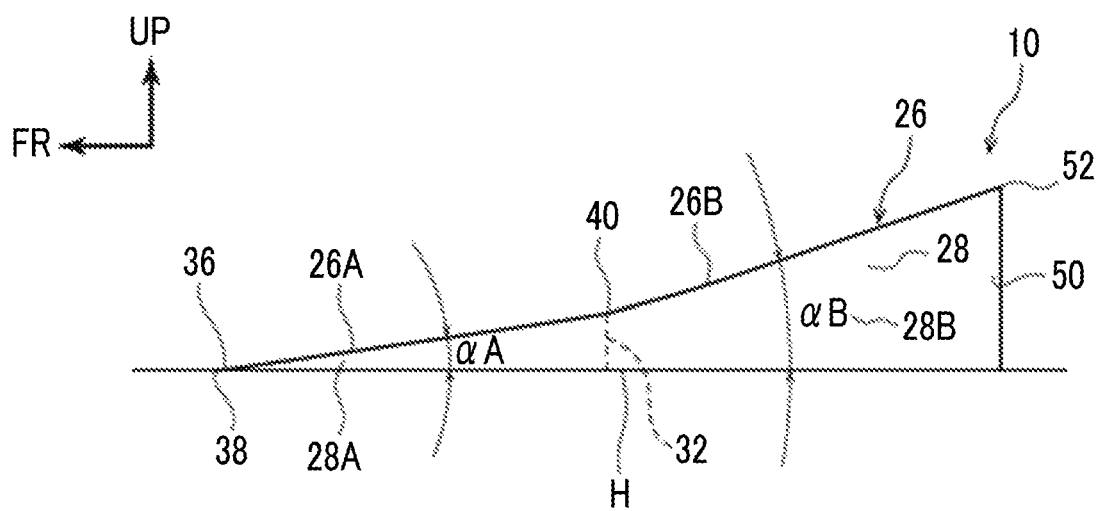
FIG. 5 is an enlarged sectional view taken along line V-V in FIG. 4.

In a vehicle bottom view, the upper wall 26 has a generally trapezoidal shape and the shape of the upper wall 26 is substantially the same as that of the inlet 24. As illustrated in FIG. 5, a front end 36 of the upper wall 26 is connected to a front end 38 of the inner-peripheral-edge portion. Further, the upper wall 26 is inclined upward in the vehicle-height direction as the upper wall 26 extends toward the rear of the vehicle 12 in the vehicle front-rear direction. That is, the upper wall 26 is inclined upward in the vehicle-height direction, such that the position of the rear end of the upper wall 26 is higher in the vehicle-height direction than the position of the front end of the upper wall 26. The upper wall 26 includes a first upper-wall bent portion 40 where a ridge extends in the vehicle-width direction. The upper wall 26 includes an upper-wall front portion 26A located forward of the first upper-wall bent portion 40 in the vehicle front-rear direction, and an upper-wall rear portion 26B located rearward of the first upper-wall bent portion 40 in the vehicle front-rear direction. The inclination of the upper-wall front portion 26A and the inclination of the upper-wall rear portion 26B differ from each other. In other words, the first upper-wall bent portion 40 is located at the boundary between the upper-wall front portion 26A and the upper-wall rear portion 26B.

The upper-wall rear portion 26B is inclined upward in the vehicle-height direction at an inclination angle that is larger than a predetermined inclination angle at which the upper-wall front portion 26A is inclined upward in the vehicle-height direction. More specifically, an angle $\alpha B$ made by the upper-wall rear portion 26B and a horizontal virtual plane H is set to be substantially two times larger than an angle $\alpha A$ made by the upper-wall front portion 26A and the horizontal virtual plane H. In the present embodiment, the angle $\alpha A$ is set to 7° and the angle $\alpha B$ is set to 15°. In addition, the position of the cooling duct 10 is set such that the exhaust heat recovery device 22 is disposed on a virtual extension line that is extended from the upper-wall rear portion 26B toward the rear of the vehicle 12, in a vehicle side view (refer to FIG. 2). In addition, the first upper-wall bent portion 40 is located at substantially the center of the upper wall 26 in the vehicle front-rear direction.

The inner-peripheral-edge portion has the pair of right and left ends 34 in the vehicle-width direction, and the upper wall 26 has a pair of right and left ends 46 in the vehicle-width direction. The right sidewall 28 connects the right end 34 of the inlet 24 to the right end 46 of the upper wall 26 in the vehicle-height direction, and the left sidewall 28 connects the left end 34 of the inlet 24 to the left end 46 of the upper wall 26 in the vehicle-height direction (refer to FIG. 3). As illustrated in FIG. 4, each of the right and left sidewalls 28 includes the sidewall bent portion 32. In each of the sidewalls 28, a sidewall rear portion 28B located rearward of the sidewall bent portion 32 in the vehicle front-rear direction is inclined at an inclination angle that differs from an inclination angle of a sidewall front portion 28A located forward of the sidewall bent portion 32 in the vehicle front-rear direction. In other words, the sidewall bent portion 32 is located at the boundary between the sidewall front portion 28A and the sidewall rear portion 28B.

At least a part of the sidewall rear portion 28B, which is adjacent to the sidewall front portion 28A, is inclined outward in the vehicle-width direction at an inclination angle that is larger than a predetermined inclination angle at which the sidewall front portion 28A is inclined outward in the vehicle-width direction. In other words, each sidewall 28 is bent at the sidewall bent portion 32, such that the sidewall 28 is inclined outward in the vehicle-width direction at a larger inclination angle as the sidewall 28 extends toward the rear of the vehicle 12 in the vehicle front-rear direction. Each sidewall 28 includes the sidewall bent portion 32 provided at a position corresponding to the first upper-wall bent portion 40 of the upper wall 26. Thus, the first upper-wall bent portion 40 and the sidewall bent portions 32 are located at substantially the same position in the vehicle front-rear direction.

As illustrated in FIG. 3, the outlet 30 is defined by a rear end 48 of the inner-peripheral-edge portion, rear ends 50 of the right and left sidewalls 28, and a rear end 52 of the upper wall 26. In a vehicle rear view, the outlet 30 has a generally rectangular shape of which the longitudinal direction coincides with the vehicle-width direction. The outlet 30 is opened substantially rearward in the vehicle front-rear direction.

Operations and Advantageous Effects of First Embodiment

Next, operations and advantageous effects of the first embodiment will be described.

Figure 6:
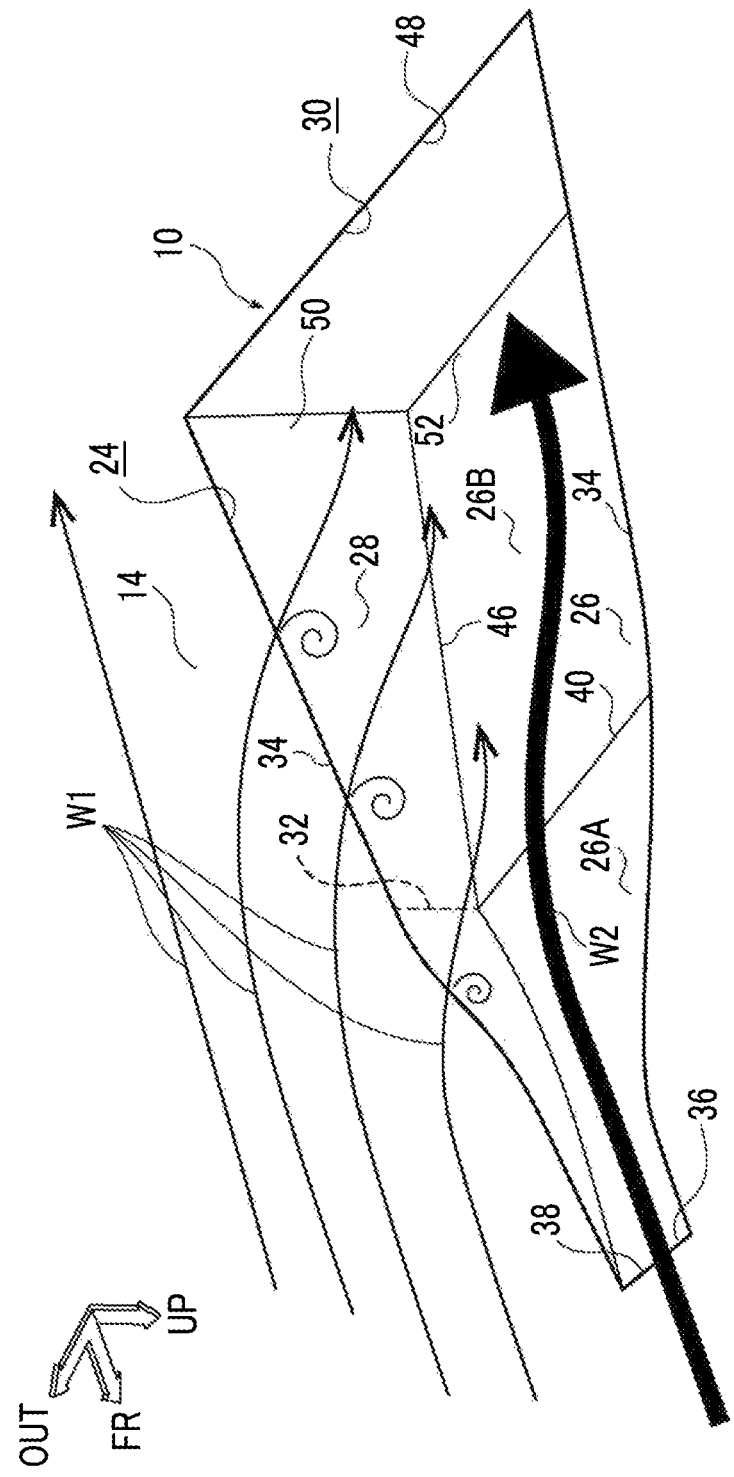
FIG. 6 is a schematic view illustrating an operation state of the bottom cover provided with the cooling duct according to the first embodiment.

Airflows in the cooling duct 10 will be described below with reference to FIG. 6. An Airflow W1 flows rearward in the vehicle front-rear direction along the bottom cover 14 while the vehicle 12 is traveling. When the airflow W1 passes through each end 34 of the inner-peripheral-edge portion, the airflow W1 separates from the bottom cover 14 due to a level difference between the bottom cover 14 and the upper wall 26. A negative pressure is generated around the end 34 due to the separation of the airflow W1 from the bottom cover 14, and thus the airflow W1 and an airflow W2 are guided into the cooling duct 10, flow rearward in the vehicle front-rear direction along the upper wall 26, and are then discharged from the outlet 30.

In the present embodiment, as illustrated in FIG. 1, the inlet 24 is provided in the bottom cover 14 that covers the lower surface of the vehicle 12. The inlet 24 is opened in the vehicle-height direction. In a vehicle bottom view, the inlet 24 has a generally trapezoidal shape and the dimension of the inlet 24 in the vehicle-width direction increases toward the rear of the vehicle 12. As illustrated in FIG. 4, according to the present embodiment, the upper wall 26 has a generally trapezoidal shape and the shape of the upper wall 26 is substantially the same as that of the inner-peripheral-edge portion, in a vehicle bottom view. The front end 36 of the upper wall 26 is connected to the front end 38 of the inner-peripheral-edge portion. The upper wall 26 is inclined upward in the vehicle-height direction as the upper wall 26 extends toward the rear of the vehicle 12 in the vehicle front-rear direction. The right sidewall 28 connects the right end 34 of the inner-peripheral-edge portion to the right end 46 of the upper wall 26 in the vehicle-height direction, and the left sidewall 28 connects the left end 34 of the inner-peripheral-edge portion to the left end 46 of the upper wall 26 in the vehicle-height direction. With this configuration, as illustrated in FIG. 2, the airflow W2 flowing under the bottom cover 14 flows out of the outlet 30 defined by the rear end 48 of the inner-peripheral-edge portion provided in the bottom cover 14, the rear ends 50 of the right and left sidewalls 28, and the rear end 52 of the upper wall 26 (refer to FIG. 3).

The upper wall 26 includes the first upper-wall bent portion 40 that is located at the boundary between the upper-wall front portion 26A and the upper-wall rear portion 26B. With this configuration, the upper-wall rear portion 26B is inclined upward in the vehicle-height direction at the inclination angle that is larger than the predetermined inclination angle at which the upper-wall front portion 26A is inclined upward in the vehicle-height direction. Thus, the air that enters the inlet 24, is drawn to the upper wall 26, flows along the upper wall 26, and then flows out of the outlet 30 is caused to flow further upward in the vehicle-height direction. As a result, even when a cooling object is disposed at a position near the cooling duct 10 and above the cooling duct 10 in the vehicle-height direction, it is possible to cool the cooling object.

As illustrated in FIG. 5, the angle $\alpha B$ made by the upper-wall rear portion 26B and the horizontal virtual plane H is set to be substantially two times larger than the angle $\alpha A$ made by the upper-wall front portion 26A and the horizontal virtual plane H. If the angle $\alpha B$ is set to an excessively large angle, such as an angle that is three times larger than the angle $\alpha A$ or an angle larger than this angle, a large difference between the angle $\alpha A$ and the angle $\alpha B$ may cause the air flowing along the upper-wall front portion 26A to separate from the upper wall 26 and the air may fail to flow along the upper-wall rear portion 26B. On the other hand, if the angle $\alpha B$ is set to an angle that is slightly larger than the angle $\alpha A$ (e.g., an angle that is two times larger than the angle $\alpha A$ or an angle smaller than this angle), the air flowing along the upper wall 26 may not be caused to flow sufficiently upward in the vehicle-height direction. In contrast to this, in the present embodiment, the angle $\alpha B$ is set to be substantially two times larger than the angle $\alpha A$. Thus, the air flowing along the upper-wall front portion 26A flows along the upper-wall rear portion 26B without being separated from the upper wall 26. Thus, the air flowing along the upper wall 26 and then flowing out of the outlet 30 is more reliably caused to flow upward in the vehicle-height direction. As a result, even when a cooling object is disposed above the cooling duct 10 in the vehicle-height direction, it is possible to further reliably cool the cooling object.

Each of the right and left sidewalls 28 includes the sidewall bent portion 32 located at the boundary between the sidewall rear portion 28B and the sidewall front portion 28A. With this configuration, in each of the sidewalls 28, at least a part of the sidewall rear portion 28B, which is adjacent to the sidewall front portion 28A, is inclined outward in the vehicle-width direction at the inclination angle that is larger than the predetermined inclination angle at which the sidewall front portion 28A is inclined outward in the vehicle-width direction, in a vehicle bottom view. The air flowing substantially in the vehicle front-rear direction along the bottom cover 14 is easily separated from the bottom cover 14, especially near the sidewall bent portion 32 of each sidewall 28. Due to the separation of the air from the bottom cover 14, a negative pressure is generated, and thus a larger amount of air is drawn to the upper wall 26. The first upper-wall bent portion 40 and the sidewall bent portions 32 are located at substantially the same position in the vehicle front-rear direction. Thus, the air that is separated from the bottom cover 14 and then drawn to the upper wall 26 in the sidewall bent portion 32 is caused to flow further upward in the vehicle-height direction by the first upper-wall bent portion 40 of the upper wall 26. As a result, even when a cooling object is disposed at a position near the cooling duct 10 and above the cooling duct 10 in the vehicle-height direction, it is possible to further reliably cool the cooling object.

The outlet 30 is opened substantially rearward in the vehicle front-rear direction. Thus, the air flowing from the front side of the vehicle 12 while the vehicle 12 is traveling is caused to flow smoothly from the inlet 24 to the outlet 30. As a result, it is possible to cool a cooling object while restraining the air drag.

The upper-wall rear portion 26B of the upper wall 26 is not curved, and, due to the first upper-wall bent portion 40, the upper-wall rear portion 26B is inclined upward in the vehicle-height direction at the inclination angle that is larger than the inclination angle at which the upper-wall front portion 26A is inclined upward in the vehicle-height direction. In general, when the air flows along a curved wall, the air flows substantially in a radial manner. Thus, it is difficult to cause the air to densely flow to a target site (i.e., a cooling object). As a result, the flow rate of the air that is brought into contact with the cooling object may be low. In contrast to this, in the present embodiment, the airflow direction is changed by the first upper-wall bent portion 40, and it is thus possible to cause the air to densely flow to a cooling object. That is, it is possible to increase the flow rate of the air that is brought into contact with the cooling object. In addition, in the present embodiment, the air drag is lower and the flow rate of the air is higher than those when the upper wall 26 is curved.

Second Embodiment

Next, a cooling duct 60 according to a second embodiment of the disclosure will be described with reference to FIG. 7, FIG. 8, and FIG. 9. Note that, the same reference symbols as those in the first embodiment will be assigned to the same elements as those in the first embodiment, and detailed description thereof will be omitted.

Figure 7:
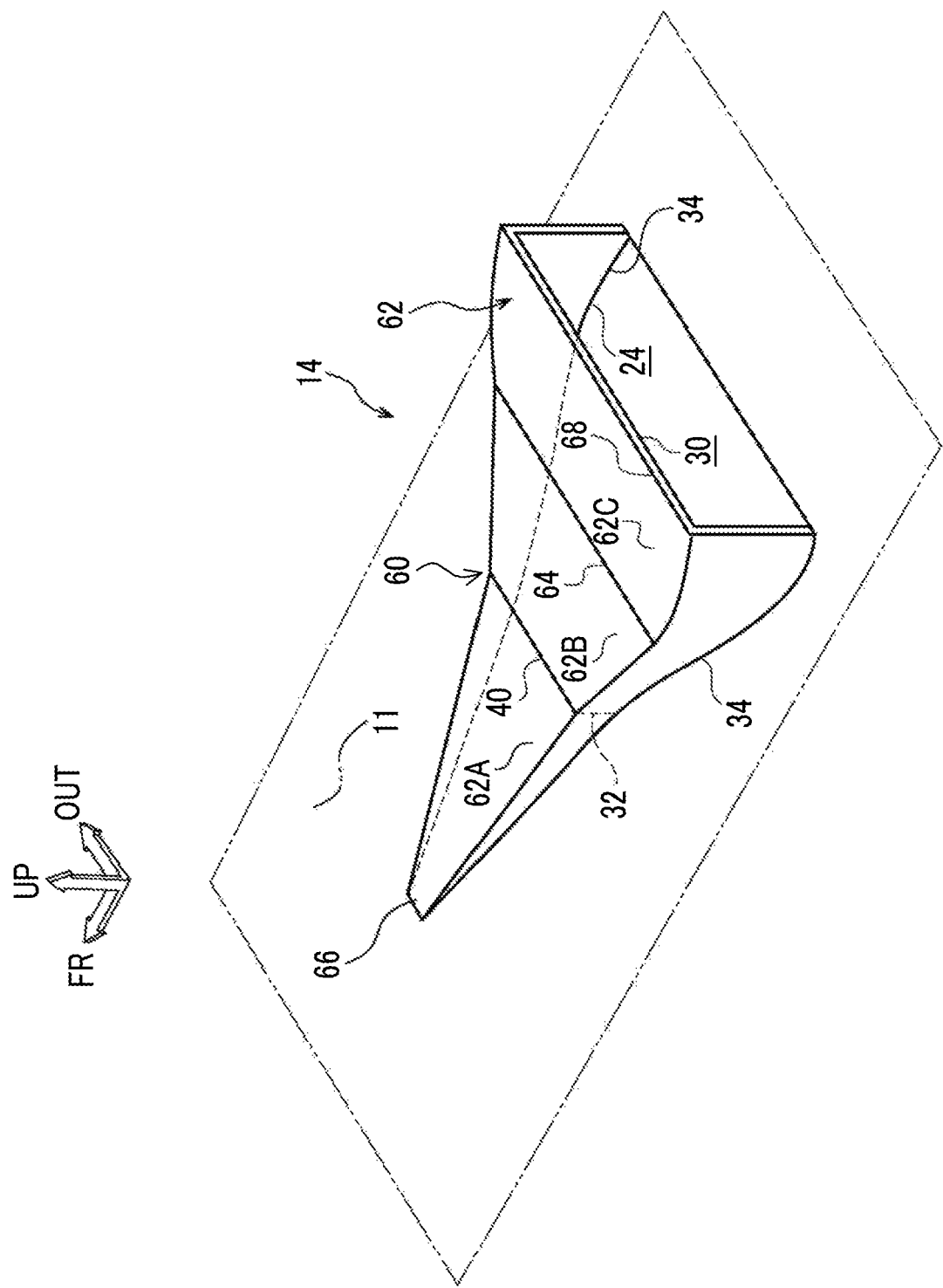
FIG. 7 is a perspective view illustrating a state where a bottom cover provided with a cooling duct according to a second embodiment is viewed from a position inside a vehicle in a direction toward the outside of the vehicle.

As illustrated in FIG. 7, the cooling duct 60 according to the second embodiment has a basic configuration similar to that of the first embodiment, and the second embodiment differs from the first embodiment in that a second upper-wall bent portion 64 is provided in an upper wall 62.

Figure 8:
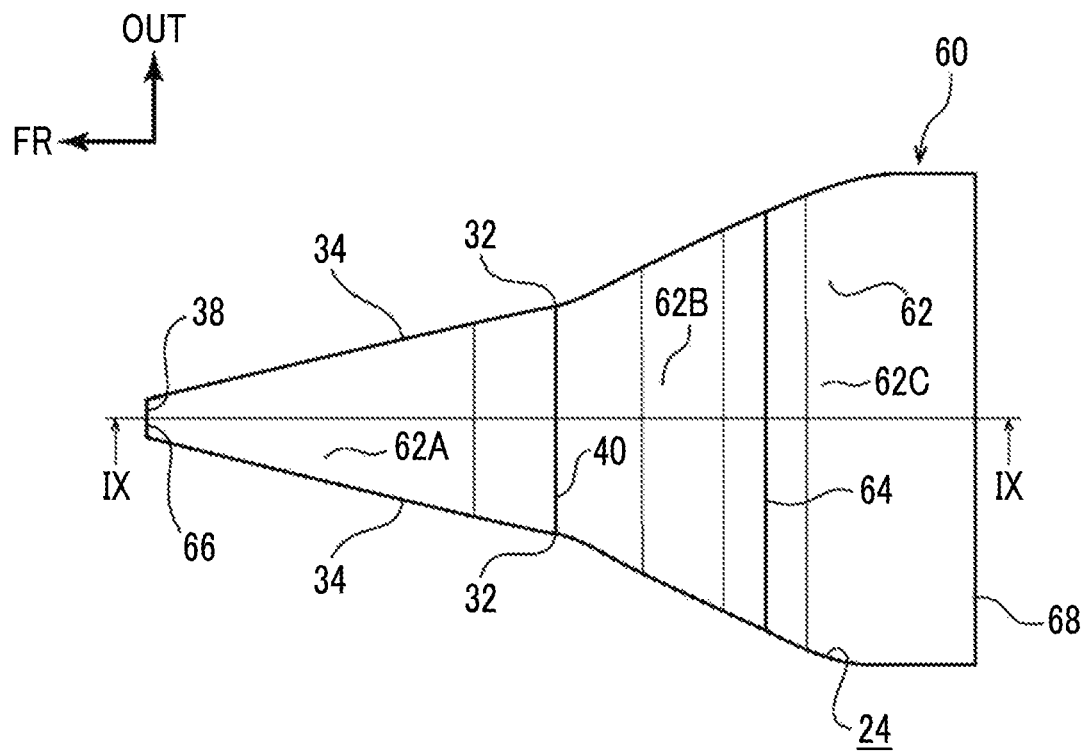
FIG. 8 is a vehicle bottom view illustrating a part of the bottom cover provided with the cooling duct according to the second embodiment.
Figure 9:
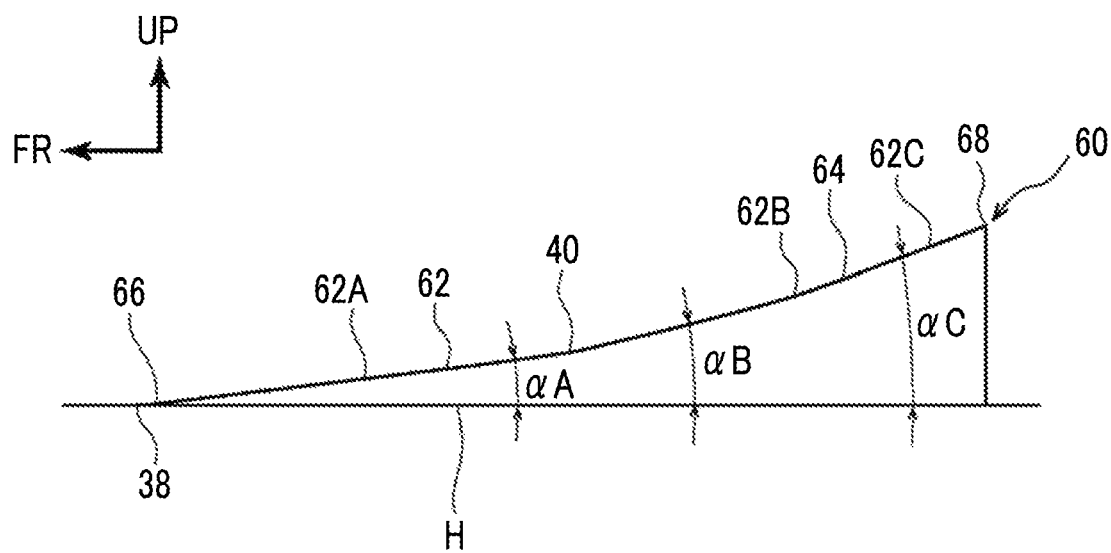
FIG. 9 is an enlarged sectional view taken along line IX-IX in FIG. 8.

As illustrated in FIG. 8, in a vehicle bottom view, the upper wall 62 has a generally trapezoidal shape and the shape of the upper wall 62 is substantially the same as that of the inlet 24. As illustrated in FIG. 9, a front end 66 of the upper wall 62 is connected to the front end 38 of the inner-peripheral-edge portion. Further, the upper wall 62 is inclined upward in the vehicle-height direction as the upper wall 62 extends toward the rear of the vehicle 12 in the vehicle front-rear direction. That is, the upper wall 62 is inclined upward in the vehicle-height direction, such that the position of the rear end of the upper wall 62 is higher in the vehicle-height direction than the position of the front end of the upper wall 62. The first upper-wall bent portion 40 is provided at substantially the center of the upper wall 62 in the vehicle front-rear direction. The upper wall 62 includes an upper-wall front portion 62A located forward of the first upper-wall bent portion 40 in the vehicle front-rear direction, and an upper-wall rear portion 62B located rearward of the first upper-wall bent portion 40 and forward of the second upper-wall bent portion 64 (described below) (i.e., located between the first upper-wall bent portion 40 and the second upper-wall bent portion 64) in the vehicle front-rear direction. The inclination of the upper-wall front portion 62A and the inclination of the upper-wall rear portion 62B differ from each other. Further, the second upper-wall bent portion 64 is provided at substantially the center of an upper-wall rear-side portion composed of the upper-wall rear portion 62B and the upper-wall rearmost portion 62C in the vehicle front-rear direction. The inclination of the upper-wall rear portion 62B and the inclination of an upper-wall rearmost portion 62C located rearward of the second upper-wall bent portion 64 in the vehicle front-rear direction differ from each other. In other words, the first upper-wall bent portion 40 is located at the boundary between the upper-wall front portion 62A and the upper-wall rear portion 62B. Further, the second upper-wall bent portion 64 is located at the boundary between the upper-wall rear portion 62B and the upper-wall rearmost portion 62C. A rear end 68 of the upper wall 62 is located rearward of the second upper-wall bent portion 64 in the vehicle front-rear direction.

The angle $\alpha B$ made by the upper-wall rear portion 62B and the horizontal virtual plane H is set to be substantially two times larger than the angle $\alpha A$ made by the upper-wall front portion 62A and the horizontal virtual plane H. An angle $\alpha C$ made by the upper-wall rearmost portion 62C and the horizontal virtual plane H is set to be substantially three times larger than the angle $\alpha A$ made by the upper-wall front portion 62A and the horizontal virtual plane H. In the present embodiment, the angle $\alpha A$ is set to 7°, the angle $\alpha B$ is set to 14°, and the angle $\alpha C$ is set to 21°. In addition, the position of the cooling duct 10 is set such that the exhaust heat recovery device 22 illustrated in FIG. 2 is disposed on a virtual extension line that is extended from the upper-wall rearmost portion 62C toward the rear of the vehicle 12, in a vehicle side view.

Operations and Advantageous Effects of First Embodiment

Next, operations and advantageous effects of the second embodiment will be described.

As described above, the cooling duct 60 in the second embodiment has the same configuration as that of the cooling duct 10 in the first embodiment except that the second upper-wall bent portion 64 is provided in the upper wall 62 of the cooling duct 60. Thus, the configuration in the second embodiment produces the advantageous effect similar to that in the first embodiment. Due to provision of the second upper-wall bent portion 64, there is provided the upper-wall rearmost portion 62C that is inclined upward in the vehicle-height direction at the inclination angle that is larger than the inclination angle of the upper-wall rear portion 62B. Thus, the air is caused to flow further upward in the vehicle-height direction along the upper wall 62. As a result, even when a cooling object is disposed above the cooling duct 10 in the vehicle-height direction, it is possible to bring the air into contact with the cooling object, thereby cooling the cooling object.

In the first and second embodiments, the first upper-wall bent portion 40 is provided at substantially the center of each of the upper walls 26, 62 in the vehicle front-rear direction. However, the position of the first upper-wall bent portion 40 is not limited to this, and the first upper-wall bent portion 40 may be provided at another position. However, it is preferable to provide the first upper-wall bent portion 40 at substantially the center of each of the upper walls 26, 62 in the vehicle front-rear direction, so that the air flowing along each of the upper walls 26, 62 is more reliably caused to flow upward in the vehicle-height direction without being separated from each of the upper walls 26, 62.

The outlet 30 is opened toward the rear of the vehicle 12. However, the configuration of the outlet 30 is not limited to this, and the outlet 30 may be opened in another direction. For example, the outlet 30 may be opened upward in the vehicle-height direction.

The angle $\alpha A$ is set to 7°, the angle $\alpha B$ is set to 14° or 15°, and the angle $\alpha C$ is set to 21°. However, the angle $\alpha A$, the angle $\alpha B$, and the angle $\alpha C$ are not limited to these values, and may be set to other values. The angle $\alpha B$ is set to be substantially two times larger than the angle $\alpha A$. However, the angle $\alpha B$ is not limited to this value, and may be set to another value.

What is claimed is:

1. A bottom cover comprising:
a plate portion covering a lower surface of a vehicle, the plate portion including an inner-peripheral-edge portion, the inner-peripheral-edge portion defining an inlet that is opened in a vehicle-height direction, and the inner-peripheral-edge portion including a pair of right and left ends of the inner-peripheral-edge portion in a vehicle-width direction, a front end of the inner-peripheral-edge portion, and a rear end of the inner-peripheral-edge portion; and
a cooling duct including an upper wall, and a pair of right and left sidewalls,
the upper wall being inclined upward in the vehicle-height direction as the upper wall extends toward a rear of the vehicle in a vehicle front-rear direction, the upper wall including a pair of right and left ends of the upper wall in the vehicle-width direction, a rear end of the upper wall, and a front end of the upper wall, the front end of the upper wall being connected to the front end of the inner-peripheral-edge portion, the upper wall including an upper-wall front portion, an upper-wall rear portion, and a first upper-wall bent portion, the upper-wall front portion being inclined upward in the vehicle-height direction at a predetermined inclination angle, the upper-wall rear portion being inclined upward in the vehicle-height direction at an inclination angle larger than the predetermined inclination angle of the upper-wall front portion, and the first upper-wall bent portion being located at a boundary between the upper-wall front portion and the upper-wall rear portion,
the right sidewall including a rear end of the right sidewall, the left sidewall including a rear end of the left sidewall, the right sidewall connecting the right end of the inner-peripheral-edge portion to the right end of the upper wall, and the left sidewall connecting the left end of the inner-peripheral-edge portion to the left end of the upper wall,
wherein the rear ends of the right and left sidewalls, the rear end of the inner-peripheral-edge portion, and the rear end of the upper wall define an outlet.

2. The bottom cover according to claim 1, wherein an angle made by the upper-wall rear portion and a horizontal virtual plane is set to be substantially two times larger than an angle made by the upper-wall front portion and the horizontal virtual plane.

3. The bottom cover according to claim 1, wherein:
each of the right and left sidewalls includes a sidewall front portion, a sidewall rear portion, and a sidewall bent portion;
the sidewall front portion is inclined at a predetermined inclination angle, in a vehicle bottom view;
at least a part of the sidewall rear portion, the part being adjacent to the sidewall front portion, is inclined at an inclination angle that is larger than the predetermined inclination angle of the sidewall front portion, in the vehicle bottom view;
the sidewall bent portion is located at a boundary between the sidewall front portion and the sidewall rear portion; and
the sidewall bent portion is located at substantially the same position as a position of the first upper-wall bent portion in the vehicle front-rear direction.

4. The bottom cover according to claim 1, wherein the outlet is opened substantially rearward in the vehicle front-rear direction.

5. The bottom cover according to claim 1, wherein a dimension of the inlet in the vehicle-width direction increases toward the rear of the vehicle, in a vehicle bottom view.

6. The bottom cover according to claim 1, wherein the upper wall has substantially the same shape as a shape of the inlet, in a vehicle bottom view.

7. The bottom cover according to claim 1, wherein:
the upper wall further includes an upper-wall rearmost portion, and a second upper-wall bent portion;
the upper-wall rearmost portion is inclined upward in the vehicle-height direction at an inclination angle that is larger than the inclination angle of the upper-wall rear portion;
the first upper-wall bent portion is located at the boundary between the upper-wall front portion and the upper-wall rear portion; and
the second upper-wall bent portion is located at a boundary between the upper-wall rear portion and the upper-wall rearmost portion.

* * * * *

UNITED STATES PATENT AND TRADEMARK OFFICE
CERTIFICATE OF CORRECTION

PATENT NO.        : 10,578,003 B2
APPLICATION NO.   : 16/059981
DATED             : March 3, 2020
INVENTOR(S)       : Hiroshi Kinomoto et al.

Page 1 of 1

It is certified that error appears in the above-identified patent and that said Letters Patent is hereby corrected as shown below:

On the Title Page

Item (30) Foreign Application Priority Data
"Sep. 1, 2017 (JP)............ 2017-167716" is replaced with "Sep. 1, 2017 (JP)............ 2017-168716"

Signed and Sealed this
Eleventh Day of August, 2020

Andrei Iancu
*Director of the United States Patent and Trademark Office*